(12) United States Patent
Sakamoto et al.

(10) Patent No.: US 7,666,514 B2
(45) Date of Patent: Feb. 23, 2010

(54) ANTIFOULING CONDENSATION CURING ORGANOPOLYSILOXANE COMPOSITION AND UNDERWATER STRUCTURE

(75) Inventors: Takafumi Sakamoto, Usui-gun (JP); Tsuneo Kimura, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 182 days.

(21) Appl. No.: 11/295,478

(22) Filed: Dec. 7, 2005

(65) Prior Publication Data

US 2006/0074183 A1 Apr. 6, 2006

Related U.S. Application Data

(63) Continuation-in-part of application No. 10/940,798, filed on Sep. 15, 2004, now abandoned.

(30) Foreign Application Priority Data

Sep. 16, 2003 (JP) ............................. 2003-322856

(51) Int. Cl.
*B32B 9/04* (2006.01)
(52) U.S. Cl. .................. 428/447; 524/731; 106/287.14; 528/34
(58) Field of Classification Search ................. 428/447; 524/731; 106/287.14; 528/34
See application file for complete search history.

(56) References Cited

U.S. PATENT DOCUMENTS

| | | | | |
|---|---|---|---|---|
| 3,457,214 A | * | 7/1969 | Modic | 524/863 |
| 3,624,023 A | * | 11/1971 | Hartlage | 523/213 |
| 4,025,693 A | * | 5/1977 | Milne | 428/447 |
| 4,216,140 A | * | 8/1980 | Simizu | 523/200 |
| 4,354,873 A | * | 10/1982 | Supcoe et al. | 106/18.32 |
| 4,996,112 A | * | 2/1991 | Perrin et al. | 428/447 |
| 5,017,628 A | * | 5/1991 | Dietlein | 523/200 |
| 5,331,074 A | * | 7/1994 | Slater et al. | 528/14 |
| 5,904,988 A | | 5/1999 | Stein et al. | |
| 5,958,116 A | | 9/1999 | Kishihara et al. | |
| 6,107,381 A | | 8/2000 | Stein et al. | |
| 6,451,437 B1 | | 9/2002 | Amidaiji et al. | |
| 6,534,581 B1 | * | 3/2003 | Kleyer et al. | 524/379 |
| 6,723,439 B2 | | 4/2004 | Amidaiji et al. | |
| 2005/0129962 A1 | | 6/2005 | Amidaiji et al. | |

FOREIGN PATENT DOCUMENTS

| | | |
|---|---|---|
| EP | 1092758 A2 | 4/2001 |
| EP | 1092758 A3 | 12/2001 |
| EP | 1275705 A1 | 1/2003 |
| JP | 56-76452 A | 6/1981 |
| JP | 56-76453 A | 6/1981 |
| JP | 58-13673 A | 1/1983 |
| JP | 62-84166 A | 4/1987 |
| JP | 2503986 B2 | 4/1996 |
| JP | 2952375 B2 | 7/1999 |
| JP | 2001-181509 A | 7/2001 |
| WO | WO-92/00357 A1 | 1/1992 |
| WO | WO-93/06180 A1 | 4/1993 |
| WO | WO-00/14166 A1 | 3/2000 |

* cited by examiner

*Primary Examiner*—Margaret G Moore
(74) *Attorney, Agent, or Firm*—Birch, Stewart, Kolasch & Birch, LLP

(57) ABSTRACT

An anti-fouling condensation curing organopolysiloxane composition is provided comprising in admixture, (A) 100 parts by weight of a base polymer in the form of a diorganopolysiloxane having at least two silicon atom-bonded hydroxyl or hydrolyzable groups in a molecule, at least 2 mol % of entire substituent groups being phenyl groups, (B) 0.5 to 30 parts by weight of a silane having at least two hydrolyzable groups or a partial hydrolytic condensate thereof, and (C) 5 to 100 parts by weight of a non-reactive dialkylpolysiloxane. The composition cures at room temperature to form a coating which is non-toxic, non-detrimental to the environment, and effective for preventing aquatic organisms from depositing and growing thereon over a long term.

22 Claims, No Drawings

ANTIFOULING CONDENSATION CURING ORGANOPOLYSILOXANE COMPOSITION AND UNDERWATER STRUCTURE

CROSS-REFERENCE TO RELATED APPLICATION

This application is a continuation-in-part of copending application Ser. No. 10/940,798 filed on Sep. 15, 2004 (now abandoned), the entire contents of which are hereby incorporated by reference.

This non-provisional application claims priority under 35 U.S.C. §119(a) on Patent Application No. 2003-322856 filed in Japan on Sep. 16, 2003, the entire contents of which are hereby incorporated by reference.

TECHNICAL FIELD

This invention relates to a room temperature-vulcanizable organopolysiloxane composition suitable as a coating material and more particularly, to an RTV organopolysiloxane composition which is applied to underwater structures (e.g., ships, harbor facilities, buoys, pipe lines, bridges, submarine stations, submarine oil well excavation units, power plant water conduits, fish culture nets and fixed shore nets) to form anti-fouling coatings suitable for preventing aquatic organisms from depositing and growing on their surface. It also relates to an underwater structure coated with the composition.

BACKGROUND ART

Known in the art are a variety of room temperature-vulcanizable (RTV) silicone rubber compositions which cure into rubbery elastomers at room temperature. Rubbers resulting from such RTV compositions have improved weather resistance, durability, heat resistance and freeze resistance as compared with other organic rubbers and are thus used in a wide variety of fields. Especially in the building field, RTV compositions are often used for the bonding of glass plates, the bonding of metal and glass, the sealing of concrete joints and the like. Recently, RTV compositions newly find wide use as coating material for buildings, plants, water conduits (inclusive of inner and outer surfaces) and the like.

The organopolysiloxane on which RTV is based, however, has the nature of electrostatic charging and is thus likely to adsorb dust in air. This is problematic in that surfaces of cured sealing or coating materials are markedly fouled with the lapse of time, losing aesthetic appearance. One typical solution to this problem is by adding or incorporating surfactants having a polyoxyethylene group, sorbitan residue or disaccharide residue to RTV (see JP-A 56-76452 and JP-A 56-76453). To achieve fully satisfactory results by the above method, the surfactants must be added in large amounts, undesirably degrading the adhesion which is one important function of RTV sealing or coating materials.

Once underwater structures are installed or in service, aquatic organisms living in waters like sea and rivers such as barnacle, lamp chimney, serpula, mussel, Bryozoa, and seaweeds (e.g., Enteromorpha and Ulva) deposit and grow on splashed and submerged surface areas, causing various damages. In the case of a ship, for example, the deposition of organisms to the hull increases frictional resistance to water to reduce the speed. The fuel consumption must be increased to maintain a certain speed, which is uneconomical. If organisms deposit on structures of a harbor facility which are fixed at or below the water surface, it becomes difficult for the structures to exert their own function and sometimes, their substrates can be eroded. If organisms deposit on fish culture nets or fixed shore nets, net openings are clogged, eventually leading to the death of fishes.

Conventional means for preventing deposition and growth of aquatic organisms on underwater structures is the application to such structures of anti-fouling paints having incorporated therein toxic anti-fouling agents such as organotin compounds and cuprous oxide. Although such anti-fouling paints are effective for substantially preventing deposition and growth of aquatic organisms, the use of toxic anti-fouling agents is harmful to the environmental safety and hygiene during preparation and application of paints. Additionally, the toxic anti-fouling agent is slowly leached out of the coating in water, with the risk of contaminating the surrounding water area over a long term. For this reason, the use of toxic anti-fouling agents was legally banned.

There have been proposed paint compositions which are effective for preventing deposition and growth of aquatic organisms, but free of toxic anti-fouling agents. Paint compositions which are designed to impart anti-fouling property by reducing the surface tension of coatings include non-toxic anti-fouling paint compositions comprising RTV and liquid paraffin or petrolatum (see JP-A 58-13673 and JP-A 62-84166). Japanese Patent Nos. 2,503,986 and 2,952,375 disclose non-toxic anti-fouling paint compositions comprising a reaction curing silicone resin and a less compatible, non-reactive, polar group-containing silicone resin wherein under the impetus of volume shrinkage associated with curing of the reaction curing silicone resin, the polar group-containing silicone resin bleeds out of the surface, which cooperates with the low surface tension of reaction curing silicone resin, to exhibit anti-fouling property. These non-toxic anti-fouling paint compositions, however, suffer from environmental safety and hygiene problems because the less compatible, non-reactive, polar group-containing silicone resin serving as bleed oil is a polyoxyethylene group-containing silicone resin in which ethylene oxide or propylene oxide is added to a silicon atom via a C—C bond or a silicone resin having an alkoxy group bonded to a silicon atom at a molecular end via an ethylene oxide or propylene oxide group.

SUMMARY OF THE INVENTION

An object of the present invention is to provide an anti-fouling RTV organopolysiloxane composition which is applied to an underwater structure to form an anti-fouling coating which is effective for preventing deposition and growth of aquatic organisms on a surface thereof, and maintains the effect over time and solves the environmental safety and hygiene problems. Another object is to provide an underwater structure coated with the composition.

Making a study on the anti-fouling effect of oil bleed used in the prior art, the inventors have discovered that a satisfactory anti-fouling effect is attained by using a non-reactive diorganopolysiloxane of the following general formula (4), especially dimethylpolysiloxane and/or diethylpolysiloxane as a bleed oil of high safety in a considerable amount, and modifying the structure of diorganopolysiloxane as a base polymer such that at least two silicon atom-bonded hydroxyl or hydrolyzable groups are present in a molecule and at least 2 mol % of entire substituent groups bonded to silicon atoms are phenyl groups.

The present invention addresses an anti-fouling composition, with a primary focus on environmental safety and hygiene. Rather than oxyalkylene-modified silicones and methylphenylsilicone and dimethyldiphenylsilicone which are used as the bleed oil component in the prior art and for which only limited environmental safety data are available, the present inventors paid attention to diorganopolysiloxanes having non-reactive monovalent hydrocarbon groups bonded to silicon atoms and similar silicone oils for which full environmental safety data are available.

In prior art anti-fouling silicone rubber compositions, substituent groups on the base polymer are substituted or unsubstituted monovalent hydrocarbon groups, most often methyl groups, while few examples use phenyl groups.

With respect to the use of phenyl groups as the substituent group, a typical uncurable composition is a transparent silicone compound (Japanese Patent No. 2,782,068) and a typical (flame retardant) curable composition is an RTV polyorganosiloxane composition (Japanese Patent No. 2,502,714). The purpose of using phenyl groups is to improve transparency in the former, and to improve flame retardance in the latter.

JP-A 2000-248067 relates to an organic resin modifier, a silicone-modified organic resin and a coating composition in which a silicone-modified organic resin obtained through copolymerization reaction of a hydroxyphenyl group-containing silicone with an organic resin monomer is used as a coating composition. Japanese Patent No. 2,645,382 describes an anti-fouling paint composition comprising a non-grafted two phase stable mixture of a polysiloxane and a vinyl resin, which is obtained by polymerizing a vinyl monomer having at least one polymerizable unsaturated group in the presence of a diorganopolysiloxane having dialkoxy groups at both ends and containing phenyl groups. These patent publications, however, do not refer to the use of a diorganopolysiloxane having a specific amount of silicon atom-bonded phenyl groups incorporated therein as the base polymer.

As a consequence, it has been found that an RTV organopolysiloxane composition is obtainable by specifying the substituent group and structure of a base polymer as mentioned above and using a specific bleed oil as mentioned above, and that when the RTV organopolysiloxane composition is applied to an underwater structure, the resulting coating is effective for preventing deposition and growth of aquatic organisms on a surface thereof, maintains the anti-fouling effect over a long time, and solves the environmental safety and hygiene problems.

Accordingly, the present invention provides an anti-fouling condensation curing organopolysiloxane composition comprising in admixture, (A) 100 parts by weight of a base polymer in the form of a diorganopolysiloxane having at least two silicon atom-bonded hydroxyl or hydrolyzable groups in a molecule, in which at least 2 mol % of entire substituent groups bonded to silicon atoms are phenyl groups, (B) 0.5 to 30 parts by weight of a silane having at least two hydrolyzable groups in a molecule and/or a partial hydrolytic condensate thereof, and (C) 5 to 100 parts by weight of a diorganopolysiloxane having the general formula (4):

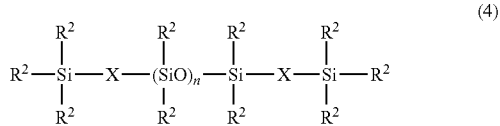

wherein $R^2$ is methyl and/or ethyl, X is an oxygen atom or a divalent hydrocarbon group of 1 to 8 carbon atoms, and the subscript n is a number such that the diorganopolysiloxane has a viscosity of 10 to 1,000,000 mm$^2$/s at 25° C.

An underwater structure coated with the composition is also provided.

The anti-fouling RTV organopolysiloxane composition of the invention forms an anti-fouling coating which is non-toxic and non-detrimental to the environment, and exhibits the anti-fouling effect of preventing deposition and growth of aquatic organisms over a long term.

DESCRIPTION OF THE PREFERRED EMBODIMENTS

The anti-fouling condensation curing organopolysiloxane composition of the invention is defined as comprising in admixture, components (A) to (C):

(A) a base polymer in the form of a diorganopolysiloxane having at least two silicon atom-bonded hydroxyl or hydrolyzable groups in a molecule, in which at least 2 mol % of entire substituent groups bonded to silicon atoms are phenyl groups, (B) a silane having at least two hydrolyzable groups in a molecule and/or a partial hydrolytic condensate thereof, and (C) a diorganopolysiloxane having a non-reactive alkyl group bonded to a silicon atom.

[Component (A)]

The diorganopolysiloxane serving as component (A) is a base polymer of the inventive anti-fouling condensation curing organopolysiloxane composition. The diorganopolysiloxane has at least two silicon atom-bonded hydroxyl or hydrolyzable groups in a molecule, and at least 2 mol % of entire substituent groups bonded to silicon atoms are phenyl groups. Suitable diorganopolysiloxanes include diorganopolysiloxanes capped with hydroxyl or hydrolyzable groups at both ends of their molecular chain, represented by the following general formula (1) or (2).

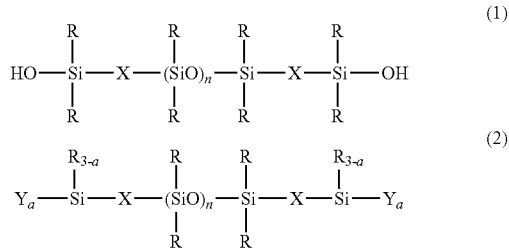

Herein R is a substituted or unsubstituted monovalent hydrocarbon group, at least 2 mol % of R being phenyl groups, X is an oxygen atom or a divalent hydrocarbon group of 1 to 8 carbon atoms, Y is a hydrolyzable group, n is such a number that the diorganopolysiloxane has a viscosity of 100 to 1,000, 000 mm$^2$/s at 25° C., and "a" is equal to 2 or 3.

Suitable substituted or unsubstituted monovalent hydrocarbon groups represented by R include alkyl groups such as methyl, ethyl, propyl, butyl, pentyl, hexyl, heptyl, octyl, nonyl, decyl and octadecyl; cycloalkyl groups such as cyclopentyl and cyclohexyl; alkenyl groups such as vinyl, allyl, butenyl, pentenyl and hexenyl; aryl groups such as phenyl, tolyl, xylyl and α- and β-naphthyl; aralkyl groups such as benzyl, 2-phenylethyl and 3-phenylpropyl; and substituted forms of the foregoing groups in which some or all hydrogen atoms are substituted with halogen atoms (e.g., F, Cl and Br) or cyano groups, such as 3-chloropropyl, 3,3,3-trifluoropropyl and 2-cyanoethyl. Of these, preferred substituent groups other than phenyl are methyl and ethyl, with methyl being most preferred. It is essential in the invention that phenyl groups account for at least 2 mol %, preferably 5 to 50 mol %, and more preferably 8 to 40 mol % of entire R groups.

X is an oxygen atom or a divalent hydrocarbon group of 1 to 8 carbon atoms, represented by —$(CH_2)_m$— wherein m is an integer of 1 to 8. Of these, an oxygen atom and —$CH_2CH_2$— are preferred.

Y is a hydrolyzable group, other than hydroxyl group, situated at ends of the molecular chain of diorganopolysiloxane. Examples include alkoxy groups such as methoxy, ethoxy and propoxy; alkoxyalkoxy groups such as methoxyethoxy, ethoxyethoxy and methoxypropoxy; acyloxy groups such as acetoxy, octanoyloxy and benzoyloxy; alkenyloxy groups such as vinyloxy, isopropenyloxy and 1-ethyl-2-methylvinyloxy; ketoxime groups such as dimethylketoxime, methylethylketoxime and diethylketoxime; amino groups such as dimethylamino, diethylamino, butylamino and cyclohexylamino; aminoxy groups such as dimethylaminoxy and diethylaminoxy; and amide groups such as N-methylacetamide, N-ethylacetamide and N-methylbenzamide. Of these, alkoxy groups are preferred.

The diorganopolysiloxane (A) should preferably have a viscosity at 25° C. of 100 to 1,000,000 mm²/s, more preferably 300 to 500,000 mm²/s, even more preferably 500 to 100,000 mm²/s, and most preferably 1,000 to 50,000 mm²/s. If the diorganopolysiloxane has a viscosity of less than 100 mm²/s at 25° C., it may become difficult to form a coating having good physical and mechanical strength. If the diorganopolysiloxane has a viscosity of more than 1,000,000 mm²/s at 25° C., the composition may have too high a viscosity to process on use.

Illustrative, non-limiting examples of the diorganopolysiloxane (A) are given below.

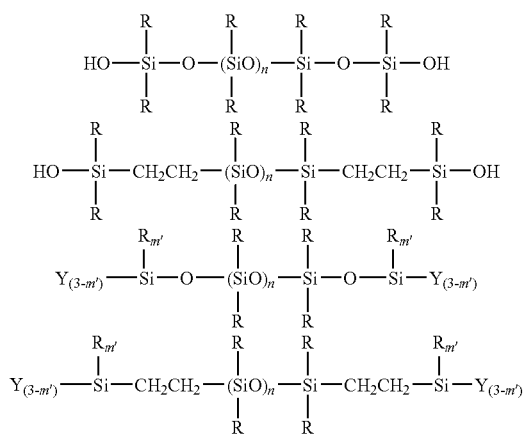

Herein, R, Y and n are as defined above, and m' is 0 or 1.

The diorganopolysiloxanes as component (A) may be used alone or in admixture of two or more.

[Component (B)]

Component (B) is a silane having at least two hydrolyzable groups in a molecule and/or a partial hydrolytic condensate thereof. It is essential for curing the inventive composition. The silane should have at least two hydrolyzable groups bonded to silicon atoms in a molecule. Typical organosilicon compounds are silanes of the general formula (3) or partial hydrolytic condensates thereof.

Herein $R^1$ is each independently a substituted or unsubstituted monovalent hydrocarbon group of 1 to 6 carbon atoms, Z is each independently a hydrolyzable group, and b is an integer of 0 to 2.

Examples of the hydrolyzable group represented by Z are as exemplified for the hydrolyzable group Y, other than hydroxyl group, situated at ends of the molecular chain of diorganopolysiloxane (A). For Z, alkoxy, ketoxime and isopropenoxy groups are preferred.

No particular limits are imposed on the silane or partial hydrolytic condensate as component (B) as long as it has at least two hydrolyzable groups in a molecule. Preferably, at least three hydrolyzable groups are contained in a molecule. A group other than the hydrolyzable group may be bonded to a silicon atom. The molecular structure may be either a silane or siloxane structure. In particular, the siloxane structure may be either straight, branched or cyclic.

The groups, other than the hydrolyzable group, represented by $R^1$ are substituted or unsubstituted monovalent hydrocarbon groups of 1 to 6 carbon atoms, examples of which include alkyl groups such as methyl, ethyl, propyl, butyl, pentyl and hexyl; cycloalkyl groups such as cyclopentyl and cyclohexyl; alkenyl groups such as vinyl, allyl, butenyl, pentenyl and hexenyl; aryl groups such as phenyl and tolyl; aralkyl groups such as benzyl and 2-phenylethyl; and halogenated alkyl groups such as 3-chloropropyl and 3,3,3-trifluoropropyl. Of these, methyl, ethyl, phenyl and vinyl are preferred.

Illustrative, non-limiting examples of the organosilicon compound (B) include ethyl silicate, propyl silicate, methyltrimethoxysilane, methyltriethoxysilane, vinyltrimethoxysilane, vinyltriethoxysilane, methyltris(methoxyethoxy)silane, vinyltris(methoxyethoxy)silane, methyltripropenoxysilane, methyltriacetoxysilane, vinyltriacetoxysilane, methyltri(methylethylketoxime)silane, vinyltri(methylethylketoxime)silane, phenyltri(methylethylketoxime)silane, propyltri(methylethylketoxime)silane, tetra(methylethylketoxime)silane, 3,3,3-trifluoropropyltri(methylethylketoxime)silane, 3-chloropropyltri(methylethylketoxime)silane, methyltri(dimethylketoxime)silane, methyltri(diethylketoxime)silane, methyltri(methylisopropylketoxime)silane, tri(cyclohexanoxime)silane, and partial hydrolytic condensates thereof. They may be used alone or in combination of two or more.

An appropriate amount of component (B) compounded is 0.5 to 30 parts by weight, more preferably 1 to 20 parts by weight per 100 parts by weight of component (A). Less than 0.5 parts by weight of component (B) may lead to insufficient crosslinking whereas more than 30 parts by weight of component (B) may result in a cured composition which is too hard and be uneconomical.

[Component (C)]

Component (C) is a diorganopolysiloxane having the general formula (4). It serves as a bleed oil.

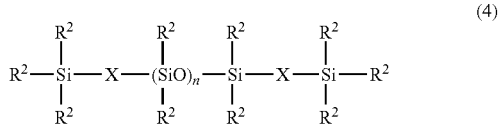

Herein, $R^2$ is methyl and/or ethyl, with methyl being preferred. X is an oxygen atom or a divalent hydrocarbon group of 1 to 8 carbon atoms, examples of which are as described above. The subscript n is such a number that the diorganopolysiloxane has a viscosity of 10 to 1,000,000 mm$^2$/s at 25° C.

The diorganopolysiloxane (C) should preferably have a viscosity at 25° C. of 10 to 1,000,000 mm$^2$/s, more preferably 20 to 100,000 mm$^2$/s, even more preferably 50 to 50,000 mm$^2$/s, and most preferably 100 to 10,000 mm$^2$/s. If the diorganopolysiloxane has a viscosity of less than 10 mm$^2$/s at 25° C., anti-fouling property may be shortly lost because of too high an oil bleed rate. If the diorganopolysiloxane has a viscosity of more than 1,000,000 mm$^2$/s at 25° C., the composition may have too high a viscosity to process on use and become less anti-fouling.

The viscosity of components (A) and (C) is as specified above. The ratio of the viscosity of component (C) to the viscosity of component (A) is preferably in a range of 0.02 to 0.8, and especially 0.05 to 0.7. If the viscosity ratio (C)/(A) is too high, least of component (C) may oil bleed so that poor anti-fouling property develops even at an immediate stage after immersion. If the viscosity ratio is too low, initial anti-fouling property is good, but may not last long.

Within the viscosity ratio range, a combination of component (A) having a viscosity of 1,000 to 2,000 mm$^2$/s with component (C) having a viscosity of 100 to 1,000 mm$^2$/s and a combination of component (A) having a viscosity of 10,000 to 30,000 mm$^2$/s with component (C) having a viscosity of 1,000 to 5,000 mm$^2$/s are preferred.

Component (C) has an excellent surface activity so that it serves to prevent aquatic organisms from depositing on cured silicone rubber coatings. Blooming on the surface, component (C) functions as a surfactant, thus contributing to the effect of preventing aquatic organisms deposition and the anti-fouling effect.

An appropriate amount of component (C) compounded is 5 to 100 parts by weight per 100 parts by weight of component (A), with 10 to 70 parts by weight being more preferred, and 20 to 50 parts by weight being most preferred. Less than 5 parts by weight of component (C) may fail to exert the addition effect whereas more than 100 parts by weight of component (C) results in a cured coating which may be opaque or soften beyond the limit.

[Other Components]

In the inventive composition, catalysts may be added for promoting cure. Use may be made of various curing catalysts commonly used in conventional RTV compositions of the condensation curing type. Exemplary catalysts include metal salts of organocarboxylic acids such as lead 2-ethyloctoate, dibutyltin dioctoate, dibutyltin acetate, dibutyltin dilaurate, butyltin 2-ethylhexoate, iron 2-ethylhexoate, cobalt 2-ethylhexoate, manganese 2-ethylhexoate, zinc 2-ethylhexoate, stannous caprylate, tin naphthenate, tin oleate, tin butanoate, titanium naphthenate, zinc naphthenate, cobalt naphthenate, and zinc stearate; organotitanic acid esters such as tetrabutyl titanate, tetra-2-ethylhexyl titanate, triethanolamine titanate and tetra(isopropenyloxy)titanate; organotitanium compounds such as organosiloxytitanium and β-carbonyltitanium; alkoxyaluminum compounds; aminoalkyl-substituted alkoxysilanes such as 3-aminopropyltriethoxysilane and N-(trimethoxysilylpropyl)ethylenediamine; amine compounds and salts thereof such as hexylamine and dodecylamine phosphate; quaternary ammonium salts such as benzyltriethylammonium acetate; alkali metal salts of lower fatty acids such as potassium acetate, sodium acetate and lithium bromate; dialkylhydroxylamines such as dimethylhydroxylamine and diethylhydroxylamine; and guanidine compounds and guanidyl group-containing silanes or siloxanes as represented by the following formulae.

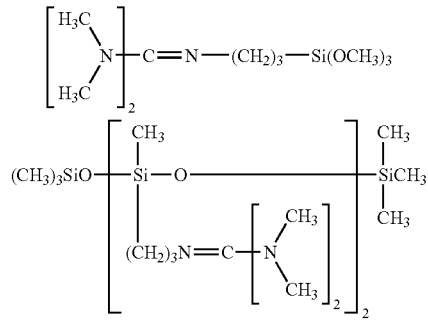

These catalysts may be used alone or in admixture.

When used, the amount of the curing catalyst is not particularly limited. It may be used in a catalytic amount. Typically, the catalyst is preferably used in an amount of 0.01 to 20 parts by weight, more preferably 0.1 to 10 parts by weight per 100 parts by weight of component (A). If the amount of the catalyst, when used, is below the range, the resulting composition may become less curable depending on the type of crosslinking agent. If the amount of the catalyst is above the range, the resulting composition may become less storage stable.

For the reinforcement or extending purpose, fillers may be used in the inventive composition. Suitable fillers include hydrophilic silica such as fumed silica and precipitated silica, hydrophobic silica obtained by surface treatment of the foregoing silica with hexamethyldisilazane or cyclic dimethylsiloxane, quartz, diatomaceous earth, titanium oxide, aluminum oxide, lead oxide, iron oxide, carbon black, bentonite, graphite, calcium carbonate, calcium silicate, silica zeolite, mica, clay, glass beads, glass microballoons, shirasu balloons, glass fibers, polyvinyl chloride beads, polystyrene beads, and acrylic beads. Of these, calcium carbonate, calcium silicate, silica zeolite and hydrophilic silica having a BET specific surface area of at least 10 m$^2$/g, especially at least 50 to 400 m$^2$/g are preferred.

The amount of the filler compounded may be determined in accordance with a particular purpose and the type of filler and is typically 3 to 500 parts by weight, especially 5 to 100 parts by weight per 100 parts by weight of the diorganopolysiloxane as the base polymer.

The inventive composition is preferably prepared by previously heat treating a mixture of the diorganopolysiloxane (A) as the base polymer and the filler at a temperature of at least 100° C., especially 120 to 180° C. and compounding components (C) and (B) therein. Component (B) may be compounded at the same time as component (C) or later.

In the inventive composition, optional additives may be compounded in ordinary amounts as long as the objects of the invention are not compromised. Suitable additives include plasticizers, colorants such as pigments, flame retardants, thixotropic agents, bactericides, fungicides, and adhesion improvers such as carbon-functional silanes having amino, epoxy or thiol groups (e.g., γ-glycidoxypropyl-trimethoxysilane and aminopropyltriethoxysilane).

The inventive composition is applicable to underwater structures to form a coating on their surface. Suitable underwater structures include ships, harbor facilities, buoys, pipe lines, bridges, submarine stations, submarine oil well excavation units, power plant water conduits, fish culture nets and fixed shore nets. The coating of the inventive composition typically has a thickness of 25 to 750 μm, and especially 50 to 400 μm. The inventive composition may be applied and cured at room or normal temperature.

EXAMPLE

Examples and Comparative Examples are given below for further illustrating the invention although the invention is not limited thereto. All parts are by weight. The viscosity is a measurement at 25° C.

Example 1

A composition was prepared by combining 70 parts of α,ω-dihydroxy-diphenyldimethyl-polysiloxane having a viscosity of 1,500 mm$^2$/s (a proportion of phenyl groups relative to entire substituent groups bonded to silicon atoms: 10 mol %) with 15 parts of fumed silica having a specific surface area of 200 m$^2$/g and intimately mixing them under vacuum while heating at 150 C. for 2 hours. The mixture was then admixed under vacuum with 12 parts of vinyltris(methylethylketoxime)silane and 1 part of γ-glycidoxypropyltriethoxysilane until uniform. The mixture was further admixed under vacuum with 30 parts of α,ω-trimethylsiloxy-dimethyl-polysiloxane having a viscosity of 100 mm$^2$/s until uniform.

Example 2

A composition was prepared as in Example 1 except that calcium silicate was used instead of the fumed silica having a specific surface area of 200 m$^2$/g.

Example 3

A composition was prepared as in Example 1 except that α,ω-dihydroxy-diphenyldimethyl-polysiloxane having a viscosity of 20,000 mm$^2$/s (a proportion of phenyl groups relative to entire substituent groups bonded to silicon atoms: 10 mol %) was used instead of the α,ω-dihydroxy-diphenyldimethyl-polysiloxane having a viscosity of 1,500 mm$^2$/s (a proportion of phenyl groups relative to entire substituent groups bonded to silicon atoms: 10 mol %), and α,ω-trimethylsiloxy-dimethyl-polysiloxane having a viscosity of 1,000 mm$^2$/s was used.

Example 4

A composition was prepared as in Example 3 except that calcium silicate was used instead of the fumed silica having a specific surface area of 200 m$^2$/g.

Example 5

A composition was prepared as in Example 1 except that α,ω-dihydroxy-diphenyldimethyl-polysiloxane having a viscosity of 1,500 mm$^2$/s (a proportion of phenyl groups relative to entire substituent groups bonded to silicon atoms: 25 mol %) was used instead of the α,ω-dihydroxy-diphenyldimethyl-polysiloxane having a viscosity of 1,500 mm$^2$/s (a proportion of phenyl groups relative to entire substituent groups bonded to silicon atoms: 10 mol %).

Comparative Example 1

A composition was prepared as in Example 1 except that α,ω-trimethylsiloxy-dimethyl-polysiloxane having a viscosity of 100 mm$^2$/s was omitted.

Comparative Example 2

A composition was prepared as in Example 1 except that α,ω-dihydroxy-dimethyl-polysiloxane having a viscosity of 1,500 mm$^2$/s was used instead of the α,ω-dihydroxy-diphenyldimethyl-polysiloxane having a viscosity of 1,500 mm$^2$/s (a proportion of phenyl groups relative to entire substituent groups bonded to silicon atoms: 10 mol %).

Comparative Example 3

A composition was prepared as in Comparative Example 2 except that calcium silicate was used instead of the fumed silica having a specific surface area of 200 m$^2$/g.

Comparative Example 4

A composition was prepared as in Comparative Example 2 except that fumed silica surface treated with dimethyldichlorosilane and having a specific surface area of 200 m$^2$/g was used instead of the fumed silica having a specific surface area of 200 m$^2$/g.

Comparative Example 5

A composition was prepared as in Comparative Example 2 except that α,ω-trimethylsiloxy-diphenyldimethyl-polysiloxane having a viscosity of 100 mm$^2$/s (a proportion of phenyl groups relative to entire substituent groups bonded to silicon atoms: 10 mol %) was used instead of the α,ω-trimethylsiloxy-dimethyl-polysiloxane having a viscosity of 100 mm$^2$/s.

[Test]

An epoxy base anti-corrosion paint was previously coated onto a plate to a thickness of 200 μm. Each of the compositions of Examples and Comparative Examples was coated thereon and kept at 23° C. and 50% RH for 7 days for curing to form a cured film of 300 μm thick. The thus coated plates were test specimens. In a suspension test, the specimens were suspended at a depth of 1.5 m in seawater at a Kanagawa seashore for 12 months. The deposition of shells such as barnacle and seaweed on the specimens was observed and rated among no, some and much deposits (represented by symbols ○, Δ and X). The compositions of Examples 1 to 5 and Comparative Examples are shown in Table 1. The results are shown in Tables 2 and 3.

TABLE 1

| Component (parts by weight) | Example | | | | | Comparative Example | | | | |
|---|---|---|---|---|---|---|---|---|---|---|
| | 1 | 2 | 3 | 4 | 5 | 1 | 2 | 3 | 4 | 5 |
| A-1 | 70 | 70 | | | | 70 | | | | |
| A-2 | | | 70 | 70 | | | | | | |
| A-3 | | | | | 70 | | | | | |
| A-4 | | | | | | | 70 | 70 | 70 | 70 |
| B-1 | 12 | 12 | 12 | 12 | 12 | 12 | 12 | 12 | 12 | 12 |
| C-1 | 30 | 30 | | | 30 | | 30 | 30 | 30 | |
| C-2 | | | 30 | 30 | | | | | | |
| C-3 | | | | | | | | | | 30 |
| D-1 | 15 | | 15 | | 15 | 15 | 15 | | | 15 |
| D-2 | | 15 | | 15 | | | | 15 | | |
| D-3 | | | | | | | | | 15 | |
| E-1 | 1 | 1 | 1 | 1 | 1 | 1 | 1 | 1 | 1 | 1 |

(A-1) α, ω-dihydroxy-diphenyldimethyl-polysiloxane (viscosity: 1,500 mm$^2$/s, phenyl content: 10 mol %)

TABLE 1-continued

| Component (parts by weight) | Example | | | | | Comparative Example | | | | |
|---|---|---|---|---|---|---|---|---|---|---|
| | 1 | 2 | 3 | 4 | 5 | 1 | 2 | 3 | 4 | 5 |

(A-2) α,ω-dihydroxy-diphenyldimethyl-polysiloxane (viscosity: 20,000 mm²/s, phenyl content: 10 mol %)
(A-3) α,ω-dihydroxy-diphenyldimethyl-polysiloxane (viscosity: 1,500 mm²/s, phenyl content: 25 mol %)
(A-4) α,ω-dihydroxy-dimethyl-polysiloxane (viscosity: 1,500 mm²/s)
(B-1) vinyltris(methylethylketoxime)silane
(C-1) α,ω-trimethylsiloxy-dimethyl-polysiloxane (viscosity: 100 mm²/s)
(C-2) α,ω-trimethylsiloxy-dimethyl-polysiloxane (viscosity: 1,000 mm²/s)
(C-3) α,ω-trimethylsiloxy-diphenyldimethyl-polysiloxane (viscosity: 100 mm²/s, phenyl content: 10 mol %)
(D-1) fumed silica
(D-2) calcium carbonate
(D-3) surface treated fumed silica
(E-1) γ-glycidoxypropyltriethoxysilane

TABLE 2

| | Example | | | | |
|---|---|---|---|---|---|
| | 1 | 2 | 3 | 4 | 5 |
| 3 months | ○ | ○ | ○ | ○ | ○ |
| 6 months | ○ | ○ | ○ | ○ | ○ |
| 12 months | ○ | ○ | ○ | ○ | ○ |

TABLE 3

| | Comparative Example | | | | |
|---|---|---|---|---|---|
| | 1 | 2 | 3 | 4 | 5 |
| 3 months | X | Δ | Δ | Δ | ○ |
| 6 months | X | X | X | X | Δ |
| 12 months | X | X | X | X | Δ |

Example 6-8 and Comparative Example 6-7

According to the formulation shown in Table 4, each composition was prepared in the same manner as in Example 1. The above test was conducted for each composition. The results are shown in Table 5.

TABLE 4

| Component (parts by weight) | Example | | | Comparative Example | |
|---|---|---|---|---|---|
| | 6 | 7 | 8 | 6 | 7 |
| A-1 | 100 | 100 | 100 | 100 | 100 |
| B-1 | 12 | 12 | 12 | 12 | 12 |
| C-1 | 10 | 20 | 60 | 0 | 3 |
| D-1 | 15 | 15 | 15 | 15 | 15 |
| E-1 | 1 | 1 | 1 | 1 | 1 |

TABLE 5

| | Example | | | Comparative Example | |
|---|---|---|---|---|---|
| | 6 | 7 | 8 | 6 | 7 |
| 3 months | ○ | ○ | ○ | X | X |

TABLE 5-continued

| | Example | | | Comparative Example | |
|---|---|---|---|---|---|
| | 6 | 7 | 8 | 6 | 7 |
| 6 months | ○ | ○ | ○ | X | X |
| 12 months | ○ | ○ | ○ | X | X |

Japanese Patent Application No. 2003-322856 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An anti-fouling condensation curing organopolysiloxane composition comprising in admixture,
   (A) 100 parts by weight of a base polymer in the form of a diorganopolysiloxane having at least two silicon atom-bonded hydroxyl or hydrolyzable groups in a molecule, in which 8 to 25 mol % of entire substituent groups bonded to silicon atoms are phenyl groups, wherein said diorganopolysiloxane has a viscosity at 25° C. of 1000 to 2000 mm²/s,
   (B) 0.5 to 30 parts by weight of a silane having at least two hydrolyzable groups in a molecule and/or a partial hydrolytic condensate thereof, and
   (C) 5 to 100 parts by weight of a diorganopolysiloxane having the general formula (4):

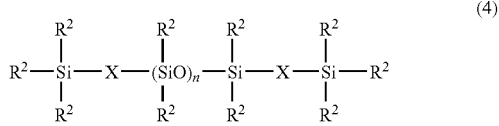

(4)

wherein R² is methyl and/or ethyl, X is an oxygen atom or a divalent hydrocarbon group of 1 to 8 carbon atoms, and the subscript n is a number such that the diorganopolysiloxane has a viscosity of 100 to 1000 at mm²/s at 25° C., provided that the ratio of the viscosity of component (C) to the viscosity of component (A) is in a range of 0.02 to 0.8, and
   (D) 5 to 100 parts by weight of hydrophilic silica having a BET specific surface area of at least 10 m²/g as a filler.

2. The composition of claim 1, wherein said base polymer (A) is a diorganopolysiloxane having the general formula (1) and/or (2):

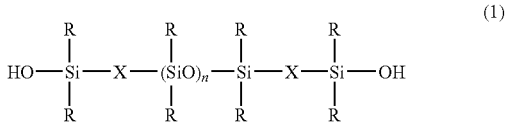

(1)

wherein R is a substituted or unsubstituted monovalent hydrocarbon group, at least 2 mol % of R being phenyl groups, X is an oxygen atom or a divalent hydrocarbon group of 1 to 8 carbon atoms, and n is such a number that the diorganopolysiloxane has a viscosity of 1000 to 2000 mm²/s at 25° C.,

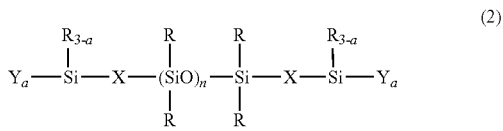

wherein R is a substituted or unsubstituted monovalent hydrocarbon group, at least 2 mol % of R being phenyl groups, X is an oxygen atom or a divalent hydrocarbon group of 1 to 8 carbon atoms, Y is a hydrolyzable group, "a" is equal to 2 or 3, and n is such a number that the diorganopolysiloxane has a viscosity of 1000 to 2000 mm²/s at 25° C.

3. The composition of claim 1, wherein component (B) is a silane of the general formula (3):

$$R^1_b SiZ_{4-b} \qquad (3)$$

wherein $R^1$ is each independently a substituted or unsubstituted monovalent hydrocarbon group of 1 to 6 carbon atoms, Z is each independently a hydrolyzable group, and b is an integer of 0 to 2, and/or a partial hydrolytic condensate thereof.

4. The composition of claim 1, wherein component (C) is dimethylpolysiloxane.

5. The composition of claim 1, further comprising a filler selected from among calcium carbonate, calcium silicate and silica zeolite.

6. The composition of claim 1, wherein the ratio in viscosity of diorganopolysiloxane (C) to diorganopolysiloxane (A) is from 0.05 to 0.7.

7. An underwater structure coated with a cured product of an anti-fouling condensation curing organopolysiloxane composition comprising in admixture, (A) 100 parts by weight of a base polymer in the form of a diorganopolysiloxane having at least two silicon atom-bonded hydroxyl or hydrolyzable groups in a molecule, in which 8 to 25 mol % of entire substituent groups bonded to silicon atoms are phenyl groups, wherein said diorganopolysiloxane has a viscosity at 25° C. of 1000 to 2000 mm²/s, (B) 0.5 to 30 parts by weight of a silane having at least two hydrolyzable groups in a molecule and/or a partial hydrolytic condensate thereof, and (C) 5 to 100 parts by weight of a diorganopolysiloxane having the general formula (4):

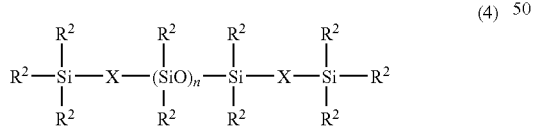

wherein $R^2$ is methyl and/or ethyl, X is an oxygen atom or a divalent hydrocarbon group of 1 to 8 carbon atoms, and the subscript n is a number such that the diorganopolysiloxane has a viscosity of 100 to 1000 mm²/s at 25° C., provided that the ratio of the viscosity of component (C) to the viscosity of component (A) is in a range of 0.02 to 0.8, and (D) 5 to 100 parts by weight of hydrophilic silica having a BET specific surface area of at least 10 m²/g as a filler.

8. The underwater structure of claim 7, wherein said base polymer (A) is a diorganopolysiloxane having the general formula (1) and/or (2):

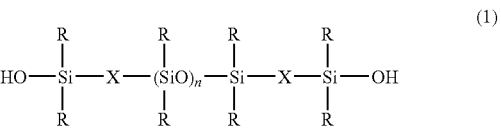

wherein R is a substituted or unsubstituted monovalent hydrocarbon group, at least 2 mol % of R being phenyl groups, X is an oxygen atom or a divalent hydrocarbon group of 1 to 8 carbon atoms, and n is such a number that the diorganopolysiloxane has a viscosity of 1000 to 2000 mm²/s at 25° C.,

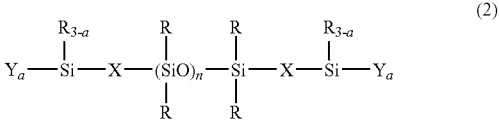

wherein R is a substituted or unsubstituted monovalent hydrocarbon group, at least 2 mol % of R being phenyl groups, X is an oxygen atom or a divalent hydrocarbon group of 1 to 8 carbon atoms, Y is a hydrolyzable group, "a" is equal to 2 or 3, and n is such a number that the diorganopolysiloxane has a viscosity of 1000 to 2000 mm²/s at 25° C.

9. The underwater structure of claim 7, wherein component (B) is a silane of the general formula (3):

$$R^1_b SiZ_{4-b} \qquad (3)$$

wherein $R^1$ is each independently a substituted or unsubstituted monovalent hydrocarbon group of 1 to 6 carbon atoms, Z is each independently a hydrolyzable group, and b is an integer of 0 to 2, and/or a partial hydrolytic condensate thereof.

10. The underwater structure of claim 7, wherein component (C) is dimethylpolysiloxane.

11. The underwater structure of claim 7, further comprising a filler selected from among calcium carbonate, calcium silicate, and silica zeolite.

12. An anti-fouling condensation curing organopolysiloxane composition comprising in admixture, (A) 100 parts by weight of a base polymer in the form of a diorganopolysiloxane having at least two silicon atom-bonded hydroxyl or hydrolyzable groups in a molecule, in which 8 to 25 mol % of entire substituent groups bonded to silicon atoms are phenyl groups, wherein said diorganopolysiloxane has a viscosity at 25° C. of 10,000 to 30,000 mm²/s, (B) 0.5 to 30 parts by weight of a silane having at least two hydrolyzable groups in a molecule and/or a partial hydrolytic condensate thereof, and (C) 5 to 100 parts by weight of a diorganopolysiloxane having the general formula (4):

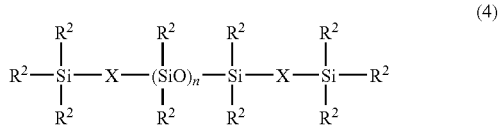

wherein $R^2$ is methyl and/or ethyl, X is an oxygen atom or a divalent hydrocarbon group of 1 to 8 carbon atoms, and the subscript n is a number such that the diorganopolysiloxane has a viscosity of 1000 to 5000 mm²/s at 25° C., provided that the ratio of the viscosity of component (C) to the viscosity of component (A) is in a range of 0.02 to 0.8, and (D) 5 to 100 parts by weight of hydrophilic silica having a BET specific surface area of at least 10 m²/g as a filler.

13. The composition of claim 12, wherein said base polymer (A) is a diorganopolysiloxane having the general formula (1) and/or (2):

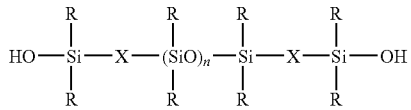

wherein R is a substituted or unsubstituted monovalent hydrocarbon group, at least 2 mol % of R being phenyl groups, X is an oxygen atom or a divalent hydrocarbon group of 1 to 8 carbon atoms, and n is such a number that the diorganopolysiloxane has a viscosity of 10,000 to 30,000 mm²/s at 25° C.,

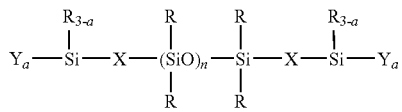

wherein R is a substituted or unsubstituted monovalent hydrocarbon group, at least 2 mol % of R being phenyl groups, X is an oxygen atom or a divalent hydrocarbon group of 1 to 8 carbon atoms, Y is a hydrolyzable group, "a" is equal to 2 or 3, and n is such a number that the diorganopolysiloxane has a viscosity of 10,000 to 30,000 mm²/s at 25° C.

14. The composition of claim 12, wherein component (B) is a silane of the general formula (3):

wherein $R^1$ is each independently a substituted or unsubstituted monovalent hydrocarbon group of 1 to 6 carbon atoms, Z is each independently a hydrolyzable group, and b is an integer of 0 to 2, and/or a partial hydrolytic condensate thereof.

15. The composition of claim 12, wherein component (C) is dimethylpolysiloxane.

16. The composition of claim 12, further comprising a filler selected from among calcium carbonate, calcium silicate and silica zeolite.

17. The composition of claim 12, wherein the ratio in viscosity of diorganopolysiloxane (C) to diorganopolysiloxane (A) is from 0.05 to 0.7.

18. An underwater structure coated with a cured product of an anti-fouling condensation curing organopolysiloxane composition comprising in admixture, (A) 100 parts by weight of a base polymer in the form of a diorganopolysiloxane having at least two silicon atom-bonded hydroxyl or hydrolyzable groups in a molecule, in which 8 to 25 mol % of entire substituent groups bonded to silicon atoms are phenyl groups, wherein said diorganopolysiloxane has a viscosity at 25° C. of 10,000 to 30,000 mm²/s, (B) 0.5 to 30 parts by weight of a silane having at least two hydrolyzable groups in a molecule and/or a partial hydrolytic condensate thereof, and (C) 5 to 100 parts by weight of a diorganopolysiloxane having the general formula (4):

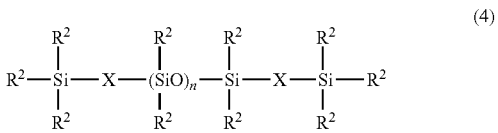

wherein $R^2$ is methyl and/or ethyl, X is an oxygen atom or a divalent hydrocarbon group of 1 to 8 carbon atoms, and the subscript n is a number such that the diorganopolysiloxane has a viscosity of 1000 to 5000 mm²/s at 25° C., provided that the ratio of the viscosity of component (C) to the viscosity of component (A) is in a range of 0.02 to 0.8, and (D) 5 to 100 parts by weight of hydrophilic silica having a BET specific surface area of at least 10 m²/g as a filler.

19. The underwater structure of claim 18, wherein said base polymer (A) is a diorganopolysiloxane having the general formula (1) and/or (2):

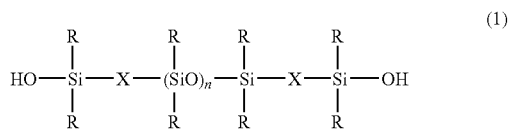

wherein R is a substituted or unsubstituted monovalent hydrocarbon group, at least 2 mol % of R being phenyl groups, X is an oxygen atom or a divalent hydrocarbon group of 1 to 8 carbon atoms, and n is such a number that the diorganopolysiloxane has a viscosity of 10,000 to 30,000 mm²/s at 25° C.,

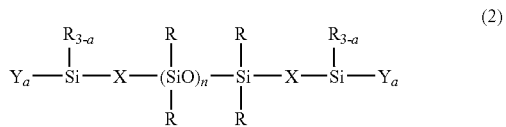

wherein R is a substituted or unsubstituted monovalent hydrocarbon group, at least 2 mol % of R being phenyl groups, X is an oxygen atom or a divalent hydrocarbon group of 1 to 8 carbon atoms, Y is a hydrolyzable group, "a" is equal to 2 or 3, and n is such a number that the diorganopolysiloxane has a viscosity of 10,000 to 30,000 mm²/s at 25° C.

20. The underwater structure of claim 18, wherein component (B) is a silane of the general formula (3):

wherein $R^1$ is each independently a substituted or unsubstituted monovalent hydrocarbon group of 1 to 6 carbon atoms, Z is each independently a hydrolyzable group, and b is an integer of 0 to 2, and/or a partial hydrolytic condensate thereof.

21. The underwater structure of claim 18, wherein component (C) is dimethylpolysiloxane.

22. The underwater structure of claim 18, further comprising a filler selected from among calcium carbonate, calcium silicate, and silica zeolite.

* * * * *